United States Patent [19]
Zitzlaff et al.

[11] Patent Number: 5,788,427
[45] Date of Patent: Aug. 4, 1998

[54] INDEXABLE INSERT

[75] Inventors: Wolfgang Zitzlaff, Graevenwiesbach; Edgar Schutz, Fehl-Ritzenhausen, both of Germany

[73] Assignee: Kennametal Inc., Latrobe, Pa.

[21] Appl. No.: 727,622

[22] PCT Filed: Jul. 12, 1995

[86] PCT No.: PCT/US95/08669
§ 371 Date: Feb. 21, 1997
§ 102(e) Date: Feb. 21, 1997

[87] PCT Pub. No.: WO96/05009
PCT Pub. Date: Feb. 22, 1996

[30] Foreign Application Priority Data

Aug. 11, 1994 [DE] Germany ............... 44 28 514.0

[51] Int. Cl.$^6$ ..................................... B23B 27/22
[52] U.S. Cl. ...................... 407/114; 407/116; 407/115
[58] Field of Search ........................... 407/113, 114, 407/115, 116, 2, 5, 6, 40, 42

[56] References Cited

U.S. PATENT DOCUMENTS 4,087,192  5/1978  Hertel .......................... 407/114
4,214,846  7/1980  Kraemer ....................... 407/114
5,028,175  7/1991  Pawlik ........................... 407/40
5,626,189  5/1997  Hutchinson ............... 407/116 X
5,688,081  11/1997  Paya ............................ 407/115

FOREIGN PATENT DOCUMENTS 0143758  6/1985  European Pat. Off. .

*Primary Examiner*—A. L. Pitts
*Assistant Examiner*—Henry W. H. Tsai
*Attorney, Agent, or Firm*—John J. Prizzi; James G. Porcelli

[57] ABSTRACT

The indexable insert possesses two parallel cutting edges on opposite sides of an indexable insert body in the form of a rectangular block. In the intermediately placed top surface descending toward the center line (M) there is a chipbreaking structure comprising alternating projections and recesses. These projections and recesses constitute a row, centered on the center line (M), of spherical-like chipbreaking bodies, between which concave chip guiding surfaces are formed. During metalcutting operations, this provides an even flow of chips with the formation of short chips which are free of grooves and tears along the edges.

18 Claims, 2 Drawing Sheets

INDEXABLE INSERT

BACKGROUND OF THE INVENTION

The invention relates to an indexable insert having two parallel cutting edges formed on opposite sides of an indexable insert body at the same level, between which a top surface is provided with a chipbreaking structure formed by projections and recesses.

Indexable inserts exist in various different basic forms and in numerous customized designs, which by dint of their geometry and composition are adapted for different purposes and materials to be machined.

SUMMARY OF THE INVENTION

The invention makes available an indexable insert which is amenable to use in high performance applications while at the same time producing short, smooth and readily controlled chips at a lower power requirement.

In the indexable insert in accordance with the invention, the mutually alternating projections and recesses of the chipbreaking structure define a continuous undulating line, the crests of such undulating line rising above the cutting edges and the troughs being below the cutting edges; in a section athwart the center line the top surface has extending inward from each cutting edge part, a descending top surface part, which rises toward the center line and merges with the chipbreaking structure. Preferably, the chipbreaking structure is defined by a row of at least generally part-spherical chipbreaking bodies, said row being parallel to the cutting edges and being centered about the center line with concave chip guiding faces being formed between the said bodies.

Further advantageous developments and convenient forms of the invention will be understood from the following detailed descriptive disclosure in conjunction with the drawings.

DETAILED DESCRIPTION OF THE INVENTION

Figure 1:
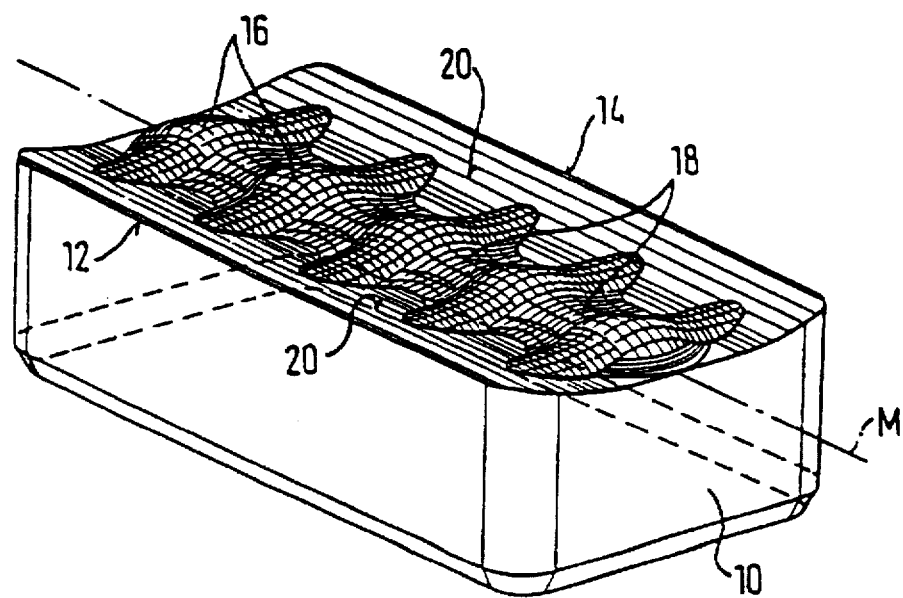
FIG. 1 is a diagrammatic perspective representation of the indexable insert, whose top surface is indicated by intersecting grid lines.
Figure 2:
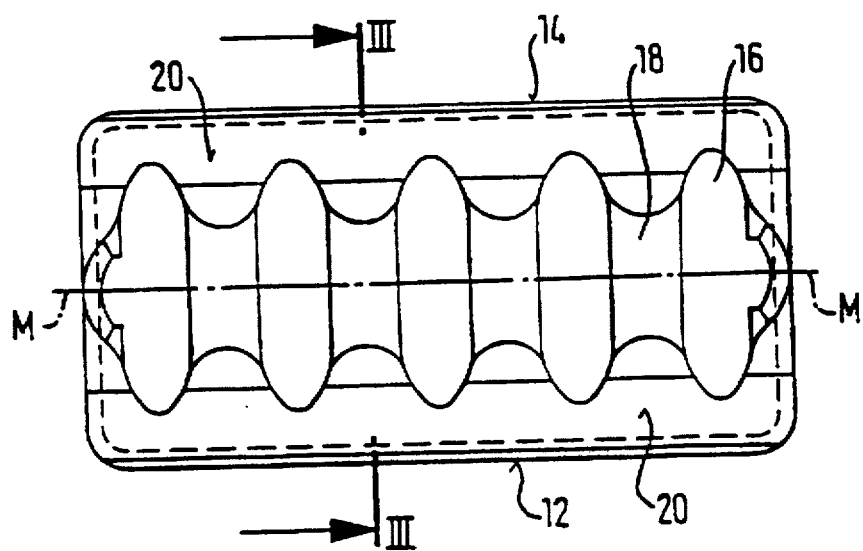
FIG. 2 is a plan view of the indexable insert.

The indexable insert illustrated in FIG. 1 comprises an indexable insert body 10 of a generally rectangular block having a flat base surface, four side surfaces extending perpendicularly to such base surface and a top surface, which possesses inwardly descending top surface parts and a chipbreaking structure arranged along the center line M of the indexable insert body 10. Two cutting edges 12 and 14 are formed at the same level and are parallel to one another between the top surface and the two longer side surfaces.

The chipbreaking structure comprises generally part-spherical projections 16 in a row centered on the center line M of the cover surface, such projections alternating with concave recesses. As seen in a section along the center line M, the projection 16 and the recesses 18, and as apparent from FIG. 4, define a continuous undulating line, whose crests rise above the cutting edges 12 and 14 and whose troughs are lower than such cutting edges 12 and 14. As seen in a section athwart such center line M, the top surface respectively has, extending inward from a cutting edge part in the direction of the center line M, a descending top surface part 20, which, rising again toward the center line M, merges with the projections 16 and the recesses 18.

Figure 3:
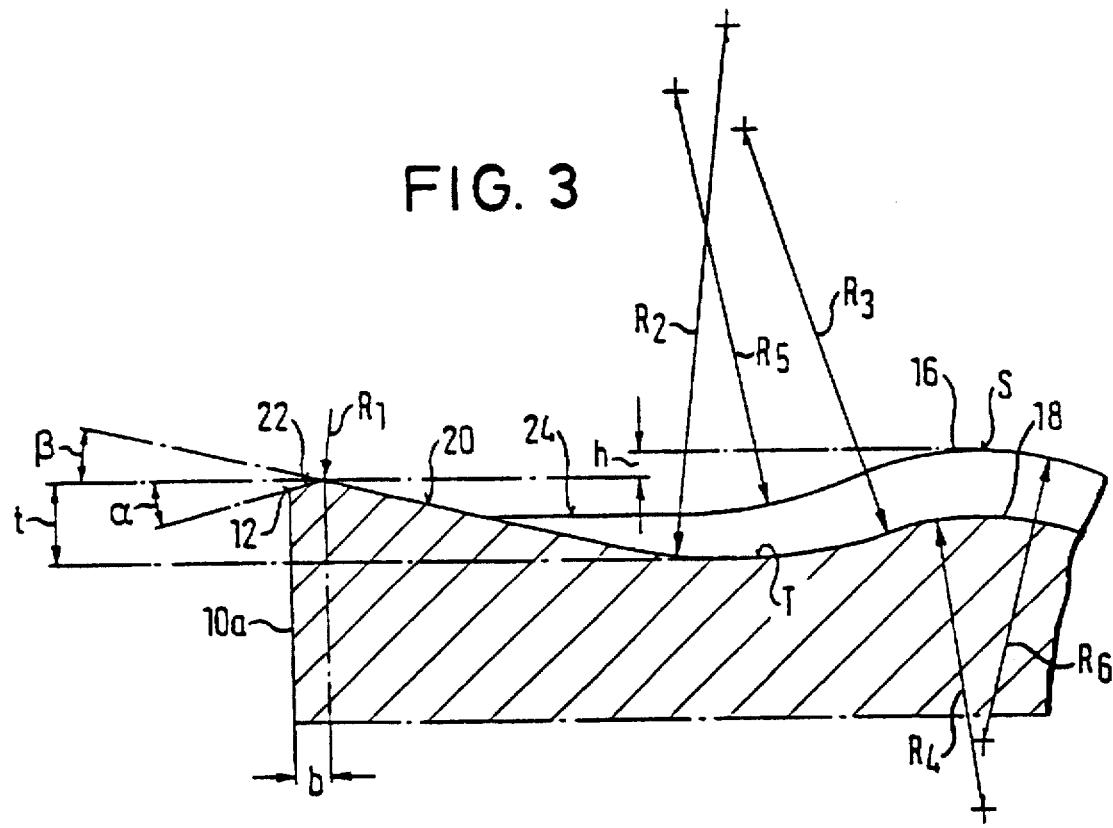
FIG. 3 is a sectional view taken on the line III in FIG. 2.
Figure 4:
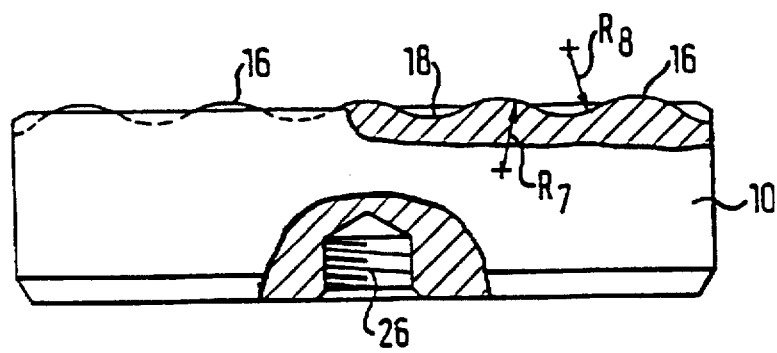
FIG. 4 is a partially sectioned side elevation of one cutting edge of the indexable insert.

In the case of the preferred embodiment, which is depicted in FIGS. 3 and 4 with the main geometrical characteristics, the clearance angle at the side surface 10a is 0°. At the cutting edge 12 there is a rising cutting edge land 22, which has a negative rake angle $\alpha$ of approximately 15°. The cutting edge land 22 is radiused to merge with a flat part of the descending top surface part 20. This radiused zone has a radius $R_1$ of less than 1 mm, as for instance, 0.8 mm. The width b of the cutting edge land 22 is less than 1 mm and amounts to, for example, 0.6 mm. The flat part of the descending top surface 20 possesses a positive rake angle $\beta$ of approximately 14°.

In FIG. 3 the section is taken through the lowest point T of one of the recesses 18. The descending top surface part 20 merges with a slight curvature, which has a radius $R_2$ of, for example 10 mm, with the lowest point T thereof. Following this, there is an ascent with a somewhat smaller radius $R_3$ of curvature of, for instance, 8 mm, which merges with a convex part of the recess 18, whose radius $R_4$ of curvature is less and, for example, amounts to 5.5 mm.

Considered again in a direction athwart the center line M but through one of the projections 16, there is a form which in principle is similar, but at a greater height. The descending top surface part 20 merges here with a flat intermediate part 24, which is adjoined, in an inward direction toward the center line M, by a concavely rising part with a radius $R_5$, which may be the same as the radius $R_3$ and, for example, amounts to 8 mm. This concavely ascending part finally runs into a convex apical part, whose radius $R_6$ of curvature is somewhat less than the radius $R_4$ of curvature and, for instance, amounts to 6 mm.

As related to the lowest point T, the flat intermediate part 24 of the top surface is approximately halfway up in relation to the common plane of the cutting edges 12 and 14. The apical point S of the projection 16 extends by an amount h past the level of the cutting edges 12 and 14; this amount t is equal to approximately ⅓ (33%) of the amount 5, by which the lowest point T is lower than the height of the cutting edges 12 and 14. This amount t is equal to, for example, 1.5 mm so that h is equal to approximately 0.5 mm. Furthermore, the reader will see from FIG. 3 that the crest of the convex part of the recesses 18 is generally at the crest of the convex part of the recesses 18 is generally at the same level as the flat intermediate part 24.

The undulating line indicated in FIG. 4, which is defined by the projections 16 and the recesses 18 along the center line M, consists of alternating convex circular arc sections with a radius $R_7$ of, for instance, 5.5 mm and concave circular arc sections with a somewhat smaller radius $R_8$ of approximately 5 mm.

Furthermore, FIG. 4 will be seen to indicate one of several threaded holes 26, which extend perpendicularly through the base surface of the indexable insert body 10 and serve for attachment of the indexable insert on a cutting tool.

The indexable insert is manufactured from conventional sintered carbide material. It is suitable for use in high performance applications. The projections 16 act as chipbreaking bodies, which in conjunction with the recesses 18 placed in between, serve to ensure the production of short, smooth chips without furrows and marginal tears. All in all, the flow of chips may be readily controlled. The chipbreaking structure does not involve providing additional drive power and, owing to the even flow of chips, the indexable insert has a long working life.

What is claimed is:

1. An indexable insert having two parallel cutting edges (12, 14) formed on opposite sides of an indexable insert body at the same level, between which a top surface is provided with a chipbreaking structure formed by projections and recesses, wherein in a section along a center line (M) parallel to the cutting edges, mutually alternating projections (16) and recesses (18) define a continuous undulating line (M) which has crests (S) rising above the cutting edges (12, 14) and troughs falling below the cutting edges (12, 14) and in a section athwart center line (M) has a top surface with descending top surface parts (20) extending inward from each cutting edge which merge with the chipbreaking structure.

2. The indexable insert as claimed in claim 1, wherein as seen in a section athwart the center line (M) and through the crest (S) of a projection (16), the descending top surface part (20) extends inwardly from the cutting edges (12, 14) and intersects with a flat intermediate part (24) remaining generally at the same level, wherein the intermediate part (24) merges with an arcuately rising initial part of a projection (16).

3. The indexable insert as claimed in claim 2, wherein each arcuately rising part is made up of a concave circular arc section and an inwardly adjoining convex circular arc section.

4. The indexable insert as claimed in claim 3, wherein the concave circular arc section possesses a substantially larger radius ($R_5$) than the convex circular arc section ($R_6$).

5. The indexable insert as claimed in claim 1, wherein as considered athwart the center line (M) and generally in the middle between two adjacent projections (16), the descending top surface part (20) merges into an arcuate trough which descends to a lowest point (T) and then ascends again.

6. The indexable insert as claimed in claim 5, wherein each arcuate trough comprises a concave circular arc section and an inwardly adjoining convex circular arc section.

7. The indexable insert as claimed in claim 6, wherein the concave circular arc section possesses a substantially larger radius ($R_2$) than the convex circular arc section ($R_4$).

8. The indexable insert as claimed in claim 1, wherein between each cutting edge (12, 14) and the descending top surface part (20) an ascending cutting edge land (22) is formed.

9. The indexable insert as claimed in claim 1, wherein the continuous undulating line is composed of alternating convex and concave circular arc sections.

10. The indexable insert as claimed in claim 9, wherein the radius ($R_7$) of the convex circular arc sections is approximately 10% larger than that radius ($R_8$) of the concave circular arc sections.

11. The indexable insert as claimed in claim 1, wherein a cutting edge land (22) extends inwardly from the cutting edges (12, 14) and has a negative rake angle ($\alpha$) of approximately 15°.

12. The indexable insert as claimed in claim 1, wherein a cutting edge land (22) extends inwardly from the cutting edges (12, 14) and merges with the top surface part with a radiused zone.

13. The indexable insert as claimed in claim 12, wherein the radiused zone has a circular arc with a radius ($R_1$) of approximately 0.8 mm.

14. The indexable insert as claimed in claim 1, wherein the descending top surface part (20) has a positive rake angle ($\beta$) of approximately 14°.

15. The indexable insert as claimed in claim 2, wherein the lowest point (T) of the descending top surface part (20) is at a distance approximately twice as far below the level of the cutting edge (12, 14) as the flat intermediate part (24).

16. The indexable insert as claimed in claim 15, wherein the flat intermediate part (24) connects the descending top surface part (20) with the projection (16) and wherein the crest of the troughs extend to approximately the level of the flat intermediate part (24).

17. The indexable insert as claimed in claim 5, wherein the crests of the undulating projections extend above the cutting edges (12, 14) by approximately 33% of the depth (t) from the lowest point (T) of the top surface to the level of the cutting edge (12, 14).

18. The indexable insert as claimed in claim 1, wherein the chipbreaking structure possesses a row of at least generally part-spherical chipbreaking bodies, said row being arranged parallel to the cutting edges and centered on the center line (M), between which bodies concave chip guiding surfaces are formed.

* * * * *